(12) United States Patent
Schilder et al.

(10) Patent No.: US 9,964,159 B2
(45) Date of Patent: May 8, 2018

(54) MULTI-STAGE TRANSMISSION FOR A MOTOR VEHICLE

(71) Applicant: Daimler AG, Stuttgart (DE)

(72) Inventors: Tobias Schilder, Stuttgart (DE); Klaus Riedl, Tuebingen (DE); Juergen Schweitzer, Filderstadt (DE); Tobias Haerter, Stuttgart (DE); Thomas Kull, Waiblingen (DE)

(73) Assignee: Daimler AG, Stuttgart (DE)

( * ) Notice: Subject to any disclaimer, the term of this patent is extended or adjusted under 35 U.S.C. 154(b) by 184 days.

(21) Appl. No.: 14/900,584

(22) PCT Filed: Jun. 17, 2014

(86) PCT No.: PCT/EP2014/001648
§ 371 (c)(1),
(2) Date: Dec. 21, 2015

(87) PCT Pub. No.: WO2014/202210
PCT Pub. Date: Dec. 24, 2014

(65) Prior Publication Data
US 2016/0146309 A1    May 26, 2016

(30) Foreign Application Priority Data

Jun. 22, 2013 (DE) .......................... 10 2013 010 523
Jul. 11, 2013 (DE) .......................... 10 2013 011 553

(51) Int. Cl.
*F16H 3/66* (2006.01)
*F16D 23/06* (2006.01)
(Continued)

(52) U.S. Cl.
CPC ............. *F16D 23/06* (2013.01); *F16D 25/14* (2013.01); *F16H 3/66* (2013.01); *F16H 61/0265* (2013.01);
(Continued)

(58) Field of Classification Search
None
See application file for complete search history.

(56) References Cited

U.S. PATENT DOCUMENTS

| | | | | |
|---|---|---|---|---|
| 3,398,606 A | * | 8/1968 | Utter .......................... | F16H 3/66 475/276 |
| 3,503,282 A | * | 3/1970 | Peterson ................... | F16H 3/66 475/276 |

(Continued)

FOREIGN PATENT DOCUMENTS

| | | |
|---|---|---|
| DE | 10 2004 017 123 A1 | 10/2005 |
| DE | 10 2008 055 626 A1 | 5/2010 |

(Continued)

OTHER PUBLICATIONS

Japanese Office Action issued in Japanese counterpart application No. 2016-520311 dated Dec. 13, 2016, with partial English translation (Six (6) pages).

(Continued)

*Primary Examiner* — Justin Holmes
(74) *Attorney, Agent, or Firm* — Crowell & Moring LLP

(57) ABSTRACT

A multi-stage transmission for a motor vehicle is disclosed. The transmission has a transmission input shaft, at least four planetary gear stages which are disposed one behind the other along a main axis of rotation, and at least one combined gear shift unit which is configured as a brake and has a rotatable coupling element as well as a friction-locking unit and a form-locking unit connected in parallel with the friction-locking unit, which are in each case provided in order to connect the rotatable coupling element fixedly to the housing. One of the planetary gear stages is associated with the combined gear shift unit and includes a transmission element which is permanently connected non-rotatably to the rotatable coupling element. The planetary gear stage associated with the combined gear shift unit includes a (Continued)

further transmission element which is permanently connected non-rotatably to the transmission input shaft.

14 Claims, 3 Drawing Sheets

(51) Int. Cl.
    *F16D 48/02*     (2006.01)
    *F16H 61/02*     (2006.01)
    *F16D 21/00*     (2006.01)
    *F16D 25/10*     (2006.01)

(52) U.S. Cl.
    CPC .............. *F16D 21/00* (2013.01); *F16D 25/10* (2013.01); *F16H 2200/0065* (2013.01); *F16H 2200/2012* (2013.01); *F16H 2200/2046* (2013.01); *F16H 2200/2064* (2013.01); *F16H 2200/2094* (2013.01); *Y10T 477/6933* (2015.01); *Y10T 477/6936* (2015.01)

(56) References Cited

U.S. PATENT DOCUMENTS

| | | | | |
|---|---|---|---|---|
| 3,835,732 A | * | 9/1974 | Mori | F16H 3/66 475/276 |
| 5,197,355 A | * | 3/1993 | Sherman | F16H 3/66 475/116 |
| 5,924,951 A | * | 7/1999 | Winzeler | F16H 3/66 475/275 |
| 5,989,148 A | * | 11/1999 | Park | F16H 3/666 475/276 |
| 8,752,686 B2 | | 6/2014 | Nakano et al. | |
| 2003/0232693 A1 | * | 12/2003 | Kakamu | F16H 57/08 475/331 |

FOREIGN PATENT DOCUMENTS

| | | |
|---|---|---|
| DE | 10 2011 108 024 A1 | 3/2012 |
| DE | 10 2011 112 235 A1 | 3/2013 |
| DE | 20 2013 002 494 U1 | 6/2013 |
| JP | 2012-207675 A | 10/2012 |

OTHER PUBLICATIONS

PCT/EP2014/001645, International Search Report (PCT/ISA/220 and PCT/ISA/210) dated Aug. 12, 2014, with partial English translation, enclosing Written Opinion of the International Searching Authority (PCT/ISA/237) (Eleven (11) pages).
German Search Report issued in counterpart DE 10 2013 011 553.1 dated Jan. 20, 2014, with Statement of Relevancy (Six (6) pages).

* cited by examiner

MULTI-STAGE TRANSMISSION FOR A MOTOR VEHICLE

BACKGROUND AND SUMMARY OF THE INVENTION

The invention relates to a multi-stage transmission.

A multi-stage transmission is already known from DE 10 2011 108 024 A1 for a motor vehicle having a transmission input shaft for non-rotatable connection of an internal combustion engine, four planetary gear stages which are disposed one behind the other along a main axis of rotation, and a combined gear shift unit. In this case the gear shift unit is designed as a brake and has a rotatable coupling element as well as a friction-locking unit and a form-locking unit connected in parallel with the friction-locking unit, which are in each case provided to connect the rotatable coupling element fixedly to the housing. One of the planetary gear stages of the multi-stage transmission in DE 10 2011 108 024 A1 is associated with the combined gear shift unit and has a transmission element which is permanently non-rotatably connected to the rotatable coupling element of the combined gear shift unit.

Furthermore, a multi-stage transmission is known from the generic DE 10 2011 112 235 A1 in which additionally the planetary gear stage associated with the combined gear shift unit comprises a further transmission element which is permanently connected non-rotatably to the transmission input shaft.

The object of the invention is in particular to reduce any power loss of the multi-stage transmission without affecting the installation space.

The invention relates to a multi-stage transmission for a motor vehicle, having a transmission input shaft for non-rotatable connection to an internal combustion engine, having at least four planetary gear stages which are disposed one behind the other along a main axis of rotation and at least one combined gear shift unit which is configured as a brake and which has a rotatable coupling element as well as a friction-locking unit and a form-locking unit connected in parallel with the friction-locking unit, which are in each case provided in order to connect the rotatable coupling element fixedly to the housing, wherein one of the planetary gear stages is associated with the combined gear shift unit and comprises a transmission element which is permanently connected non-rotatably to the rotatable coupling element of the combined gear shift unit.

Furthermore, it is assumed that the planetary gear stage associated with the combined gear shift unit comprises a further transmission element which is permanently non-rotatably connected to the transmission input shaft. In this way a transmission element of a planetary gear stage configured as an input stage can be particularly advantageously connected frictionally and/or by form-locking non-rotatably to a transmission housing, so that by securing of the transmission element selectively engageable gears with different torque requirements can be shifted in a loss-optimized and convenient manner. Due to the association of the combined gear shift unit with the planetary gear stage, which has a transmission element permanently non-rotatably attached to the transmission input shaft, an installation space can be utilized better, so that the multi-stage transmission can be of particularly compact design. In this way a power loss, in particular a drag effect, of the multi-stage transmission can be reduced in particular without affecting the installation space, in particular without the provision of an additional installation space. "Additionally" should be understood in particular to mean additional by comparison with a multi-stage transmission which lacks a combined gear shift unit associated with a planetary gear stage configured as an input stage. A "gear shift unit configured as a brake" should in particular be understood as a gear shift unit which is disposed functionally between one of the planetary gear stages and the transmission housing and is provided in order, in a closed state, to connect the rotatable coupling element thereof non-rotatably to the transmission housing of the multi-stage transmission. In this context a "form-locking unit" should be understood in particular to be a part of the combined gear shift unit which for fixed connection to the housing has a tooth system and/or claws which interengage by form-locking in order to produce a non-rotatable coupling, such as in particular a claw-type gear shift unit. In this context a "friction-locking unit" should be understood in particular to be a part of the combined gear shift unit which for fixed connection to the housing has friction elements, such as in particular discs, which are connected to one another frictionally in order to produce a non-rotatable coupling, such as in particular a disc-type gear shift unit. The friction-locking unit and the form-locking unit are preferably functionally disposed between the transmission housing and the rotatable coupling element of the combined gear shift unit. "Non-rotatably connected" should in particular be understood to mean a connection in which a power flow averaged over a complete revolution is transmitted with an unchanged torque, an unchanged direction of rotation and/or an unchanged rotational speed. A "combined gear shift unit" should in particular be understood to be a gear shift unit which for production of a non-rotatable connection has a friction-locking unit and a form-locking unit connected in parallel with the friction-locking unit, wherein the non-rotatable connection can be produced by the friction-locking unit alone, by the form-locking unit alone or jointly by the friction-locking unit and the form-locking unit. A "planetary gear stage associated with the combined gear shift unit" should be understood to be a planetary gear stage which has at least one transmission element which is permanently non-rotatably connected to the rotatable coupling element of the combined gear shift unit. A "planetary gear stage designed as an input stage" should be understood in particular to be a planetary gear stage having at least one transmission element which is permanently connected non-rotatably to the transmission input shaft. "Provided" should be understood in particular to mean specially programmed, equipped, configured and/or disposed.

According to the invention it is proposed that the form-locking unit is disposed radially inside the friction-locking unit, so that a circumferential speed of a form-locking tooth system of the form-locking unit can be kept low. The term "radially" and the term "radius" relate in particular to the main axis of rotation, so that the expression "radially" designates a direction which extends perpendicular to the main axis of rotation. A "form-locking unit disposed radially inside the friction-locking unit" should in particular be understood to be a form-locking unit of which the tooth system and/or claws run around a circular path having an average diameter which is smaller than an average diameter of a circular path on the friction surfaces of the friction elements.

Furthermore, it is proposed and assumed that the transmission element, which is permanently connected non-rotatably to the transmission input shaft, of the planetary gear stage associated with the combined gear shift unit is configured as a sun gear. As a result a driving torque provided by the internal combustion engine can be advantageously introduced into the multi-stage transmission via the planetary gear stage associated with the combined gear shift unit.

Furthermore, it is proposed that the transmission element, which is permanently connected non-rotatably to the rotatable coupling element of the combined gear shift unit, of the planetary gear stage associated with the combined gear shift unit is configured as a planetary gear support, so that the planetary gear stage configured as an input stage can be advantageously connected.

In particular it is advantageous if the planetary gear stage associated with the combined gear shift unit has a transmission element which is configured as a ring gear and can at least be connected non-rotatably to a transmission element of at least one other planetary gear stage, so that the connection of the planetary gear stage associated with the combined gear shift unit can be further improved. The expression "can at least be connected" should be understood in particular to mean that the connection can either be produced by a gear shift unit or is produced permanently.

Furthermore, it is advantageous if the rotatable coupling element of the combined gear shift unit can at least be connected non-rotatably to a transmission element of at least one of the other planetary gear stages, so that the combined gear shift unit can act on at least one further planetary gear stage.

Furthermore, it is advantageous if the multi-stage transmission has a housing end wall on the drive side, wherein the planetary gear stage associated with the combined gear shift unit is disposed immediately adjacent to the housing end wall on the input side with respect to the other planetary gear stages. In this way the planetary gear stage associated with the combined gear shift unit can be disposed on the input side, so that the combined gear shift unit can be associated with the planetary gear stage configured as an input stage without affecting the installation space. A "housing end wall on the drive side" should in particular be understood to be a housing end wall which, by comparison with an axially opposing housing end wall on the output side, is disposed closer to the internal combustion engine axially and/or along a flux of force emanating from the internal combustion engine. The expression "disposed immediately adjacent to the housing end wall on the input side with respect to the other planetary gear stages" should in particular be understood to mean that a planetary gear stage is absent axially between the housing end wall on the drive side and the planetary gear stage associated with the combined gear shift unit. The expression "axially" relates in particular to the main axis of rotation, so that the term "axially" designates a direction which extends on the main axis of rotation or parallel thereto.

In an advantageous configuration the friction-locking unit and/or the form-locking unit of the combined gear shift unit are disposed axially between the housing end wall on the drive side and the planetary gear stage associated with the combined gear shift unit, so that a particularly compact multi-stage transmission can be provided.

It is particularly advantageous if the form-locking unit of the combined gear shift unit is disposed axially between the friction-locking unit and the planetary gear stage associated with the combined gear shift unit, so that the form-locking unit can be configured in a particularly space-saving manner.

It is advantageous to place the form-locking unit on a small radius. Where appropriate the form-locking unit can be disposed on the same radius as the friction-locking element.

Furthermore it is proposed that the multi-stage transmission comprises a further gear shift unit which is configured as a clutch and has a rotatable coupling element which is permanently connected non-rotatably to the transmission input shaft and an outer disc support which is configured at least partially integrally with an inner disc support of the friction-locking unit of the combined gear shift unit. In this way a space-saving design of the combined gear shift unit and the further gear shift unit can be realized. A "gear shift unit configured as a clutch" should in particular be understood to be a gear shift unit which is provided in order that the two rotatably disposed coupling elements thereof, which are rotatable independently of one another in an opened state, can be connected non-rotatably to one another in a closed state. A gear shift unit configured as a clutch is preferably disposed in a flux of force between at least two planetary gear stages. "Integrally" should in particular be understood to mean formed in one piece, such as for example by production from a casting. The outer disc support and the inner disc support configured integrally with the outer disc support are preferably provided in order to accommodate inner discs of the friction-locking unit of the combined gear shift unit and to accommodate outer discs of a friction-locking unit of the further gear shift unit.

In particular it is advantageous if the form-locking unit of the combined gear shift unit is disposed axially between the housing end wall on the drive side and the further gear shift unit, so that an alternative arrangement of the form-locking unit can be provided.

Furthermore, it is advantageous if the combined gear shift unit has a first actuating unit provided for actuating the friction-locking unit as well as a second actuating unit provided for actuating the form-locking unit and the further gear shift unit has a third actuating unit, wherein the first actuating unit and the third actuating unit are disposed axially between the housing end wall on the drive side and the second actuating unit. In this way an advantageous actuation of the combined gear shift unit and the further gear shift unit can be achieved without the provision of additional installation space.

In an alternative embodiment it is advantageous if the combined gear shift unit has a first actuating unit provided for actuating the friction-locking unit as well as a second actuating unit provided for actuating the form-locking unit and the further gear shift unit has a third actuating unit, wherein the first actuating unit, the second actuating unit and the third actuating unit are disposed axially between the housing end wall on the drive side and the friction-locking unit of the combined gear shift unit. In this way the form-locking unit of the combined gear shift unit can be disposed radially inside the friction-locking unit of the combined gear shift unit and radially inside a friction-locking unit of the further gear shift unit, so that the circumferential speed of the form-locking tooth system can be further reduced. Furthermore, it may also be provided that closing directions of the actuating units are all aligned, so that a supply of an actuating medium to the actuating units for closing the friction-locking units and the form-locking unit can be simplified. A "closing direction" should in particular be understood to be a direction in which an actuating element of the actuating unit must be moved in order to close the friction-locking unit or the form-locking unit. In this context "oriented in the same direction" should in particular be understood to mean that the closing directions point in the same direction. An "actuating element" should in particular be understood to be an axially movable element which presses the inner and outer discs of a friction-locking unit against one another for closing the friction-locking unit or moves a form-locking tooth system of a form-locking unit into a corresponding form-locking tooth system of the form-locking unit for closing the form-locking unit.

In a further alternative embodiment it is advantageous if the combined gear shift unit has a first actuating unit provided for actuating the friction-locking unit as well as a second actuating unit provided for actuating the form-locking unit and the further gear shift unit has a third actuating unit, wherein the second actuating unit and the third actuating unit are disposed axially between the housing end wall on the drive side and the first actuating unit. In this way the form-locking unit of the combined gear shift unit can be disposed radially inside the friction-locking unit of the further gear shift unit in particular without affecting the installation space.

Moreover, it is advantageous if, with respect to an axial succession starting from the internal combustion engine, the planetary gear stage associated with the combined gear shift unit is configured as a first planetary gear stage and a planetary gear stage adjacent to the planetary gear stage associated with the combined gear shift unit is configured as a second planetary gear stage, wherein the adjacent planetary gear stage has a transmission element which is configured as a planetary gear support and is permanently connected non-rotatably to a transmission element, configured as a ring gear, of the planetary gear stage associated with the combined gear shift unit, and has a transmission element which is configured as a ring gear and is permanently connected non-rotatably to a transmission element, configured as a sun gear, of a third planetary gear stage and to a transmission element, configured as a sun gear, of a fourth planetary gear stage and can also be connected non-rotatably to the transmission element, configured as a planetary gear support, of the planetary gear stage associated with the combined gear shift unit. In this way a particularly advantageous interconnection of the planetary gear stages can be realized. With respect to the axial succession of the planetary gear stages along an axial direction starting from the internal combustion engine, the first planetary gear stage is disposed in the first place, the second planetary gear stage is disposed in the second place, the third planetary gear stage is disposed in the third place and the fourth planetary gear stage is disposed in the fourth place. A "planetary gear stage adjacent to the planetary gear stage associated with the combined gear shift unit" should be understood to be a planetary gear stage which is disposed axially next in the sequence to the planetary gear stage associated with the combined gear shift unit.

The configuration of a multi-stage transmission described below constitutes a special exemplary embodiment, for which in principle there are further kinematically equivalent exemplary embodiments. For example in particular the planetary gear stages can be formed by means of single planetary gear sets, as is set out below. However, in a kinematically equivalent manner one of the planetary gear stages can also have a double planetary gear set, so that for the same mode of action only one stationary gear ratio of the planetary gear stage must be adapted. Moreover, a connection of a sun gear and a planetary gear support or of a ring gear and a planetary gear support can also be changed, without the kinematics of the multi-stage transmission changing.

Further advantages can be seen from the following description of the drawings. Four exemplary embodiments of the invention are shown in the drawings. The drawings, the description of the drawings and the claims contain numerous features in combination. Expediently, the person skilled in the art will also consider the features singly and combine them to form meaningful further combinations.

DETAILED DESCRIPTION OF THE DRAWINGS

Figure 1:
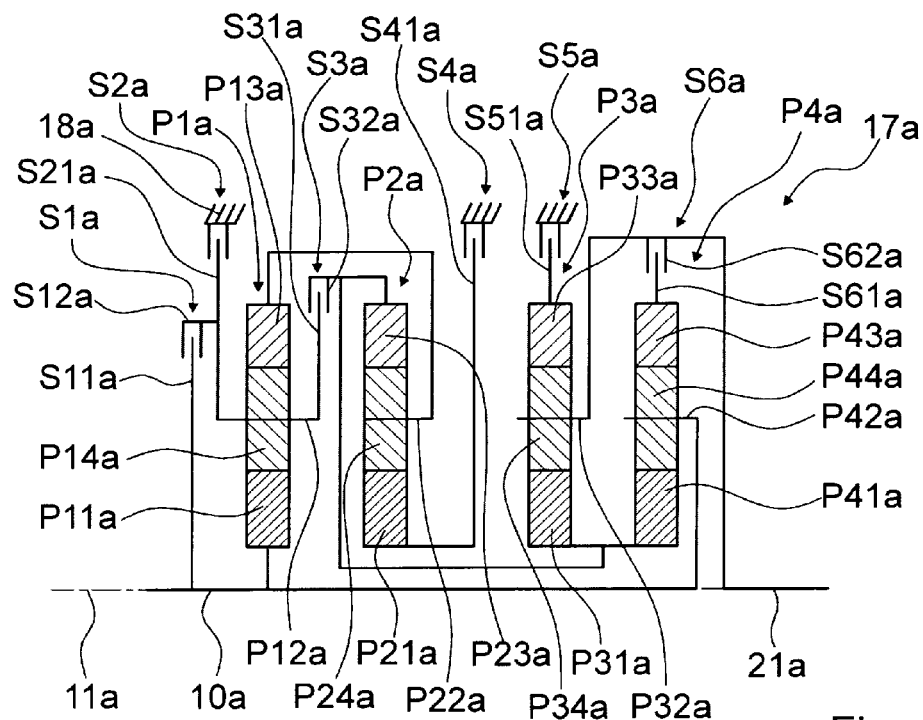
FIG. 1 shows a transmission diagram of a multi-stage transmission according to the invention.
Figure 2:
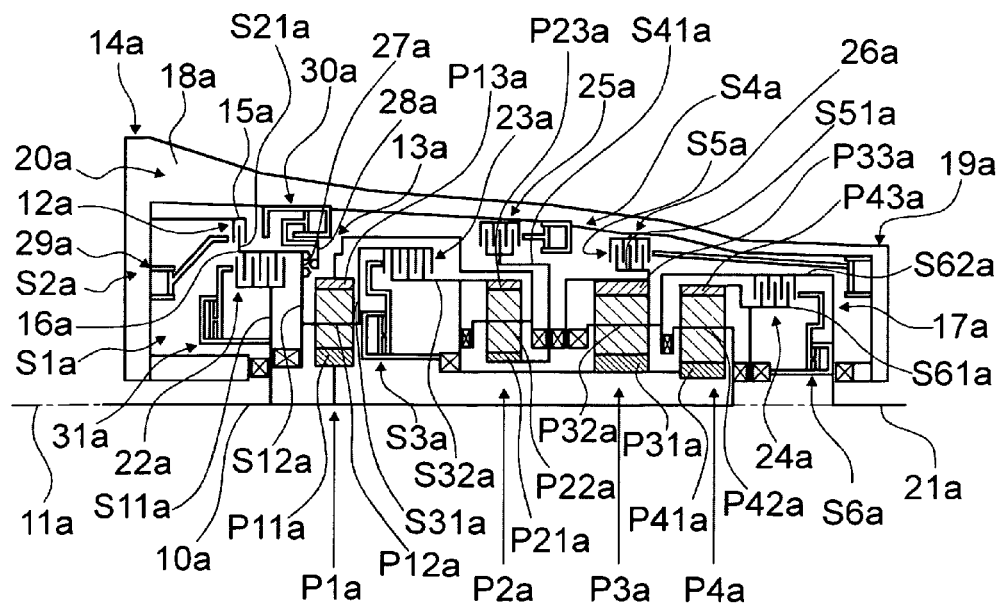
FIG. 2 shows the multi-stage transmission schematically.

FIGS. 1 and 2 show a multi-stage transmission of a motor vehicle. The motor vehicle has an internal combustion engine which is not illustrated in greater detail for driving the motor vehicle and drive gears which are not illustrated in greater detail. In this case the multi-stage transmission is disposed in a flux of force between the internal combustion engine and the drive gears. The multi-stage transmission connects the internal combustion engine to the drive gears. By means of the multi-stage transmission a transmission ratio is set between the internal combustion engine and the drive gears. The multi-stage transmission can be connected to a hybrid drive module by means of which a driving torque can be changed. Furthermore a CVT can be produced by means of the hybrid drive module and the multi-stage transmission, so that the transmission ratio can be continuously adjusted at least in part-ranges.

The multi-stage transmission has a gear wheel set $17a$ for setting of ten gears. The gear wheel set $17a$ has nine forward gears and a reverse gear. The forward transmission gears have successive transmission ratios. In this case the first forward gear has the highest transmission ratio and the last, in this exemplary embodiment the ninth forward gear, has the lowest transmission ratio, the transmission ratios decreasing from the low to the high forward gears. The reverse gear has a reverse direction of rotation by comparison with the forward gears.

The multi-stage transmission also has a transmission housing $18a$ which comprises a housing end wall $14a$ on the drive side, a housing end wall $19a$ on the output side lying axially opposite the housing end wall $14a$ on the drive side, and a circumferential housing wall $20a$ disposed axially between the housing end walls $14a$, $19a$. In this exemplary embodiment the housing end walls $14a$, $19a$ and the circumferential housing wall $20a$ are formed integrally with one another. The gear wheel set $17a$ is disposed inside the transmission housing $18a$. The transmission housing $18a$ is disposed stationarily. In principle at least one of the housing end walls $14a$, $19a$ can be formed separately from the circumferential housing wall $20a$.

The multi-stage transmission has a transmission input shaft $10a$ for introduction of a driving torque produced by the internal combustion engine into the gear wheel set $17a$. The transmission input shaft $10a$ passes through the housing end wall $14a$ on the drive side and ends inside the transmission housing $18a$ between the two housing end walls $14a$, $19a$. The transmission input shaft $10a$ is disposed in a flux of force proceeding from the internal combustion engine, after the internal combustion engine and before the gear wheel set 17a. It is provided for non-rotatable connection of the internal combustion engine and thus for non-rotatable connection of a crankshaft of the internal combustion engine to the gear wheel set 17a. The transmission input shaft 10a connects the internal combustion engine in drive terms to the gear wheel set 17a. A module which is not illustrated in greater detail and in particular provides a starting functionality can be connected upstream of the transmission input shaft 10a. A torque converter or a wet starting clutch for example is conceivable as a module connected upstream. Basically, however, the module provided for starting may also be integrated into the gear wheel set 17a.

The multi-stage transmission has a transmission output shaft 21a for output of a transmitted driving torque. The transmission output shaft 21a passes through the housing end wall 19a on the output side and ends outside the transmission housing 18a. The transmission output shaft 21a is disposed in the flux of force proceeding from the internal combustion engine after the gear wheel set 17a and before the drive gears. The transmission output shaft 21a connects the gear wheel set 17a in drive terms to the drive gears of the motor vehicle. A module (not illustrated in greater detail) can be connected downstream of the transmission output shaft 21a, and by means of this module the driving torque output from the gear wheel set 17a can be distributed to the drive gears, such as for example a planetary gear system, which is provided for speed compensation between the drive wheels, or an all-wheel drive unit which distributes the driving torque to two different drive axles. The transmission input shaft 10a and the transmission output shaft 21a can in principle be disposed in any way relative to one another.

The gear wheel set 17a has four planetary gear stages P1a, P2a, P3a, P4a which are functionally connected to one another for shifting the gears. The first planetary gear stage P1a, the second planetary gear stage P2a, the third planetary gear stage P3a and the fourth planetary gear stage P4a are disposed one behind the other along a main axis of rotation 11a. An axis of rotation of the transmission input shaft 10a coincides with the main axis of rotation 11a. All the planetary gear stages P1a, P2a, P3a, P4a of the gear wheel set 17a have a single planetary gear set. The designations "first", "second", "third" and "fourth" identify an axial succession of the planetary gear stages P1a, P2a, P3a, P4a starting from the internal combustion engine. Accordingly the first planetary gear stage P1a by comparison with the other planetary gear stages P2a, P3a, P4a is disposed at the first axial position, the second planetary gear stage P2a by comparison with the other planetary gear stages P1a, P3a, P4a is disposed at the second axial position, the third planetary gear stage P3a by comparison with the other planetary gear stages P1a, P2a, P4a is disposed at the third axial position and the fourth planetary gear stage P4a by comparison with the other planetary gear stages P1a, P2a, P3a is disposed at the fourth axial position.

The first planetary gear stage P1a and the second planetary gear stage P2a are disposed adjacent to one another, the second planetary gear stage P2a and the third planetary gear stage P3a are disposed adjacent to one another, and the third planetary gear stage P3a and the fourth planetary gear stage P4a are disposed adjacent to one another. The first planetary gear stage P1a is disposed, with respect to the planetary gear stages P2a, P3a, P4a, immediately adjacent to the housing end wall 14a on the drive side, i.e. the first planetary gear stage P1a is, by comparison with the other planetary gear stages P2a, P3a, P4a, disposed closest to the housing end wall 14a on the drive side. The fourth planetary gear stage P4a is disposed, with respect to the planetary gear stages P1a, P2a, P3a, immediately adjacent to the housing end wall 19a on the output side, i.e. the fourth planetary gear stage P4a is, by comparison with the other planetary gear stages P1a, P2a, P3a, disposed closest to the housing end wall 19a on the output side.

The four planetary gear stage P1a, P2a, P3a, P4a are described in greater detail below. The four planetary gear stages P1a, P2a, P3a, P4a each have a transmission element configured as a sun gear, a transmission element configured as a planetary gear support and a transmission element configured as a ring gear. In this case for the sake of simplicity a "first to fourth planetary gear support", a "first to fourth sun gear" and a "first to fourth ring gear" should be understood to mean respectively a planetary gear support or a sun gear or a ring gear associated with the first to fourth planetary gear stage, i.e. for example that the first planetary gear support should be understood to be a transmission element configured as a planetary gear support of the first planetary gear stage.

The first planetary gear stage P1a is disposed on the input side. The first planetary gear stage P1a comprises a first sun gear P11a, a first ring gear P13a and a first planetary gear support P12a. The first planetary gear support P12a carries planetary gears P14a of the first planetary gear stage P1a on a circular path. The planetary gears P14a mesh with the first sun gear P11a and with the first ring gear P13a. The planetary gears P14a are rotatably mounted on the first planetary gear support P12a.

The second planetary gear stage P2a is disposed centrally on the input side. The second planetary gear stage P2a comprises a second sun gear P21a, a second ring gear P23a and a second planetary gear support P22a. The second planetary gear support P22a carries planetary gears P24a of the second planetary gear stage P2a on a circular path. The planetary gears P24a mesh with the second sun gear P21a and with the second ring gear P23a. The planetary gears P24a are rotatably mounted on the second planetary gear support P22a.

The third planetary gear stage P3a is disposed centrally on the output side. The third planetary gear stage P3a comprises a third sun gear P31a, a third ring gear P33a and a third planetary gear support P32a. The third planetary gear support P32a carries planetary gears P34a of the third planetary gear stage P3a on a circular path. The planetary gears P34a mesh with the third sun gear P31a and with the third ring gear P33a. The planetary gears P34a are rotatably mounted on the third planetary gear support P32a.

The fourth planetary gear stage P4a is disposed on the output side. The planetary gear stage P4 comprises a fourth sun gear P41a, a fourth ring gear P43a and a fourth planetary gear support P42a. The fourth planetary gear support P42a carries planetary gears P44a of the fourth planetary gear stage P4a on a circular path. The planetary gears P44a mesh with the fourth sun gear P41a and with the fourth ring gear P43a. The planetary gears P44a are rotatably mounted on the fourth planetary gear support P42a.

Some of the transmission elements of the planetary gear stages P1a, P2a, P3a, P4a are permanently connected non-rotatably to one another. The first ring gear P13a is permanently connected non-rotatably to the second planetary gear support P22a. The second ring gear P23a is permanently connected non-rotatably to the third sun gear P31a and is permanently connected non-rotatably to the fourth sun gear P41a. The third sun gear P31a and the fourth sun gear P41a are permanently connected non-rotatably to one another. For introduction of the driving torque provided by the internal combustion engine the first planetary gear stage P1a and the fourth planetary gear stage P4a are in each case configured as an input stage. For configuration of the first planetary gear stage P1a as an input stage the first sun gear P11a is permanently connected non-rotatably to the transmission input shaft 10a. For configuration of the fourth planetary gear stage P4a as an input stage the fourth planetary gear support P42a is permanently connected non-rotatably to the transmission input shaft 10a. For output of the driving torque transmitted by the gear wheel set 17a the third planetary gear stage P3a and the fourth planetary gear stage P4a are in each case configured as an output stage. For configuration of the third planetary gear stage P3a as an output stage the third planetary gear support P32a is permanently connected non-rotatably to the transmission output shaft 21a. For configuration of the fourth planetary gear stage P4a as an output stage the fourth ring gear P43a can be connected non-rotatably to the transmission output shaft 21a.

For shifting the gears the gear wheel set has six gear shift units S1a, S2a, S3a, S4a, S5a, S6a. The gear shift units S1a, S2a, S3a, S4a, S5a, S6a transmit different torques in the gears. For the gear shift units S1a, S2a, S3a, S4a, S5a, S6a the gear wheel set 17a defines torque factors in the gears. Torques transmitted in the gears by the gear shift units S1a, S2a, S3a, S4a, S5a, S6a are defined in the gear wheel set 17a by the torque factors. The torque factors are dependent upon a position of the gear shift units S1a, S2a, S3a, S4a, S5a, S6a in the gear wheel set 17a. The torques which are transmitted by the gear shift units S1a, S2a, S3a, S4a, S5a, S6a are dependent upon a shifted gear, the torque factor and a driving torque. The six gear shift units S1a, S2a, S3a, S4a, S5a, S6a each have a total design torque. The respective total design torques conform to a maximum torque to be transmitted by the respective gear shift unit S1a, S2a, S3a, S4a, S5a, S6a in the associated gears. The total design torques are adapted to the gears and can differ from gear shift unit S1a, S2a, S3a, S4a, S5a, S6a to gear shift unit S1a, S2a, S3a, S4a, S5a, S6a.

The three gear shift units S1a, S3a, S6a are in each case configured as a clutch. They each have a first rotatable coupling element S11a, S31a, S61a and a second rotatable coupling element S12a, S32a, S62a. The three gear shift units S1a, S3a, S6a are in each case provided in order to connect the two coupling elements S11a, S12a, S31a, S32a, S61a, S62a thereof non-rotatably to one another.

The three gear shift units S2a, S4a, S5a are in each case configured as a brake. They each have a rotatable coupling element S21a, S41a, S51a. The gear shift units S2a, S4a, S5a are in each case provided in order to connect the rotatable coupling elements S21a, S41a, S51a thereof fixedly to the housing and thus to connect said coupling elements non-rotatably to the transmission housing 18a.

The first gear shift unit S1a has the first rotatable coupling element S11a and the second rotatable coupling element S12a. The first rotatable coupling element S11a of the first gear shift unit S1a is permanently connected non-rotatably to the transmission input shaft 10a. The second rotatable coupling element S12a of the first gear shift unit S1a is permanently connected non-rotatably to the rotatable coupling element S21a of the second coupling unit S2a. The second rotatable coupling element S12a of the first gear shift unit S1a is also permanently connected non-rotatably to the first planetary gear support P12a. Furthermore, the second rotatable coupling element S12a of the first gear shift unit S1a is permanently connected non-rotatably to the first rotatable coupling element S31a of the third gear shift unit S3a. The first gear shift unit S1a is provided in order to connect the first planetary gear support P12a non-rotatably to the transmission input shaft 10a.

The second gear shift unit S2a has the rotatable coupling element S21a. The rotatable coupling element S21a of the second gear shift unit S2a is permanently connected non-rotatably to the first planetary gear support P12a. Furthermore, the coupling element S21a of the second gear shift unit S2a is permanently connected non-rotatably to the first rotatable coupling element S31a of the third coupling unit S3a. The second gear shift unit S2a is provided in order to connect the first planetary gear support P12a fixedly to the housing.

The third gear shift unit S3a has the first rotatable coupling element S31a and the second rotatable coupling element S32a. The first rotatable coupling element S31a of the third gear shift unit S3a is permanently connected non-rotatably to the first planetary gear support P12a. The second rotatable coupling element S32a of the third gear shift unit S3a is permanently connected non-rotatably to the second ring gear P23a. The second rotatable coupling element S32a of the third gear shift unit S3a is also permanently connected non-rotatably to the third sun gear P23a. Furthermore, the second rotatable coupling element S32a of the third gear shift unit S3a is permanently connected non-rotatably to the fourth sun gear P41a. The third gear shift unit S3a is provided in order to connect the first planetary gear support P12a, the second ring gear P23a, the third sun gear P31a and the fourth sun gear P41a to one another non-rotatably.

The fourth gear shift unit S4a has the rotatable coupling element S41a. The rotatable coupling element S41a of the fourth gear shift unit S4a is permanently connected non-rotatably to the second sun gear P21a. The fourth gear shift unit S4a is provided in order to connect the second sun gear P21a fixedly to the housing.

The fifth gear shift unit S5a has the rotatable coupling element S51a. The rotatable coupling element S51a of the fifth gear shift unit S5a is permanently connected non-rotatably to the third ring gear P33a. The fifth gear shift unit S5a is provided in order to connect the third ring gear P33a fixedly to the housing.

The sixth gear shift unit S6a has the first rotatable coupling element S61a and the second rotatable coupling element S62a. The first rotatable coupling element S61a of the sixth gear shift unit S6a is permanently connected non-rotatably to the fourth ring gear P43a. The second rotatable coupling element S62a of the sixth gear shift unit S6a is permanently connected non-rotatably to the third planetary gear support P32a. The second rotatable coupling element S62a of the sixth gear shift unit S6a is also permanently connected non-rotatably to the transmission output shaft 21a. The sixth gear shift unit S6a is provided in order to connect the fourth ring gear P43a, the third planetary gear support P32a and the transmission output shaft 21a non-rotatably to one another.

The three gear shift units S1a, S3a, S6a configured as a clutch have only one friction-locking unit 22a, 23a, 24a in each case for non-rotatable connection of the coupling elements S11a, S12a, S31a, S32a, S61a, S62a. The friction-locking units 22a, 23a, 24a in each case comprise a disc set. The fourth gear shift unit S4a and the fifth gear shift unit S5a have only one friction-locking unit 25a, 26a in each case for fixed connection of the rotatable coupling elements S41a, S51a to the housing. The friction-locking units 25a, 26a in each case comprise a disc set.

The friction-locking unit 22a of the first gear shift unit S1a is disposed axially between the housing end wall 14a on the drive side and the first planetary gear stage P1a. Furthermore, the first gear shift unit S1a has an inner disc support which is permanently connected non-rotatably to the first rotatable coupling element S11a of the first gear shift unit S1a, and an outer disc support which is permanently connected non-rotatably to the rotatable second coupling element S12a of the first gear shift unit S1a. The inner disc support of the first gear shift unit S1a is permanently connected non-rotatably to the transmission input shaft 10a. The outer disc support of the first gear shift unit S1a is permanently connected non-rotatably to the first planetary gear support P12a.

The friction-locking unit 23a of the third gear shift unit S3a is disposed axially between the first planetary gear stage P1a and the second planetary gear stage P2a. The first planetary gear stage P1a is disposed axially between the friction-locking unit 22a of the first gear shift unit S1a and the friction-locking unit 23a of the third gear shift unit S3a. Furthermore, the third gear shift unit S3a has an inner disc support which is permanently connected non-rotatably to the second rotatable coupling element S32a of the third gear shift unit S3a, and an outer disc support which is permanently connected non-rotatably to the first rotatable coupling element S31a of the third gear shift unit S3a. The inner disc support of the third gear shift unit S3a is permanently connected non-rotatably to the second ring gear P23a. The outer disc support of the third gear shift unit S3a is permanently connected non-rotatably to the first planetary gear support P12a. Thus the outer disc support of the first gear shift unit S1a and the outer disc support of the third gear shift unit S3a are permanently non-rotatably connected to one another.

The friction-locking unit 25a of the fourth gear shift unit S4a is disposed axially between the first planetary gear stage P1a and the third planetary gear stage P3a. The friction-locking unit 25a of the fourth gear shift unit S4a is disposed axially at the height of the second planetary gear stage P2a. The friction-locking unit 25a of the fourth gear shift unit S4a is disposed axially between the friction-locking unit 23a of the third gear shift unit S3a and the friction-locking unit 26a of the fifth gear shift unit S5a. The second planetary gear stage P2a is disposed axially between the friction-locking unit 23a of the third gear shift unit S3a and the friction-locking unit 26a of the fifth gear shift unit S5a. The first planetary gear stage P1a is disposed axially between the first gear shift unit S1a and the fourth gear shift unit S4a. The first planetary gear stage P1a is disposed axially between the friction-locking unit 22a of the first gear shift unit S1a and the friction-locking unit 25a of the fourth gear shift unit S4a. Furthermore, the fourth gear shift unit S4a has an inner disc support which is permanently connected non-rotatably to the rotatable coupling element S41a of the fourth gear shift unit S4a, and an outer disc support which is permanently connected non-rotatably to the transmission housing 18a. The inner disc support of the fourth gear shift unit S4a is permanently connected non-rotatably to the second sun gear P21a. The outer disc support of the fourth gear shift unit S4a is connected to the circumferential housing wall 20a. It is fastened to the circumferential housing wall 20a.

The friction-locking unit 26a of the fifth gear shift unit S5a is disposed axially between the second planetary gear stage P2a and the fourth planetary gear stage P4a. The friction-locking unit 26a of the fifth gear shift unit S5a is disposed axially at the height of the third planetary gear stage P3a. The friction-locking unit 26a of the fifth gear shift unit S5a is disposed axially between the friction-locking unit 25a of the fourth gear shift unit S4a and the friction-locking unit 24a of the sixth gear shift unit S6a. The third planetary gear stage P3a is disposed axially between the friction-locking unit 25a of the fourth gear shift unit S4a and the friction-locking unit 24a of the sixth gear shift unit S6a. Furthermore the fifth gear shift unit S5a has an inner disc support which is permanently connected non-rotatably to the rotatable coupling element S51a of the fifth gear shift unit S5a, and an outer disc support which is permanently connected non-rotatably to the transmission housing 18a. The inner disc support of the fifth gear shift unit S5a is permanently connected non-rotatably to the third ring gear P33a. The outer disc support of the fifth gear shift unit S5a is attached to the circumferential housing wall 20a. It is fastened to the circumferential housing wall 20a.

The friction-locking unit 24a of the sixth gear shift unit S6a is disposed axially between the housing end wall 19a on the output side and the fourth planetary gear stage P4a. The fourth planetary gear stage P4a is disposed axially between the friction-locking unit 26a of the fifth gear shift unit S5a and the friction-locking unit 24a of the sixth gear shift unit S6a. Furthermore, the sixth gear shift unit S6a has an inner disc support which is permanently connected non-rotatably to the first rotatable coupling element S61a of the sixth gear shift unit S6a, and an outer disc support which is permanently connected non-rotatably to the second rotatable coupling element S62a of the sixth gear shift unit S6a. The inner disc support of the sixth gear shift unit S6a is permanently connected non-rotatably to the fourth ring gear P43a. The outer disc support of the sixth gear shift unit S6a is permanently connected non-rotatably to the third planetary gear support P32a and is permanently connected non-rotatably to the transmission output shaft 21a.

The second gear shift unit S2a is of combined configuration and thus has a friction-locking unit 12a and a form-locking unit 13a connected in the flux of force in parallel with the friction-locking unit 12a. The friction-locking unit 12a and the parallel connected form-locking unit 13a are in each case provided in order to connect the rotatable coupling element S21a of the second gear shift unit S2a fixedly on the housing and thus to connect said coupling element non-rotatably to the transmission housing 18a. The second gear shift unit S2a is configured as a combined gear shift unit. The first planetary gear stage P1a is configured as a planetary gear stage associated with the combined gear shift unit S2a.

The combined gear shift unit S2a is associated with the first planetary gear stage P1a configured as an input stage. The rotatable coupling element S21a of the combined gear shift unit S2a is permanently connected non-rotatably to the planetary gear support P12a of the first planetary gear stage P1a configured as an input stage. The planetary gear stage P1a configured as an input stage is disposed axially between the friction-locking unit 12a of the combined gear shift unit S2a and the friction-locking unit 25a of the fourth gear shift unit S4a. The friction-locking unit 12a transmits the torque applied to the first planetary gear support P12a in the shifted eighth forward gear and in the shifted ninth forward gear. The form-locking unit 13a transmits the torque applied to the first planetary gear support P12a only in the shifted reverse gear.

The friction-locking unit 12a and the form-locking unit 13a of the combined gear shift unit S2a each have a design torque. The design torque of the friction-locking unit 12a and the design torque of the form-locking element 13a are different. The design torque of the friction-locking unit 12a is lower than the total design torque of the second gear shift unit S2a. The design torque of the form-locking unit 13a corresponds to the total design torque of the second gear shift unit S2a. Thus the design torque of the friction-locking unit 12a is lower than the design torque of the form-locking element 13a.

In the shifted reverse gear the second gear shift unit S2a transmits a torque which is higher than the design torque of the friction-locking unit 12a and in the shifted eighth and ninth forward gear said second gear shift unit transmits a torque which is lower than the design torque of the friction-locking unit 12a. In this case in the eighth and ninth forward gear, in which the applied torque is lower than the design torque of the friction-locking unit 12a, the friction-locking unit 12a transmits the applied torque completely. In this exemplary embodiment, in the reverse gear, in which the applied torque is higher than the design torque of the friction-locking unit 12a, the form-locking unit 13a likewise transmits the applied torque completely. In principle it is also conceivable that in at least one of the gears in which the applied torque is higher than the design torque of the friction-locking unit 12a, the form-locking unit only transmits a surplus torque. In this case the surplus torque is approximately a difference between the applied torque and the design torque of the friction-locking unit 12a.

The friction-locking unit 12a of the combined gear shift unit S2a is configured as a multiple-disc brake. The friction-locking unit 12a comprises a disc set for connection of the rotatable coupling element S21a fixedly to the housing. Furthermore, the friction-locking unit 12a of the combined gear shift unit S2a has an outer disc support 15a which is permanently connected non-rotatably to the transmission housing 18a, and an inner disc support 16a which is permanently connected non-rotatably to the rotatable coupling element S21a. The inner disc support 16a of the combined gear shift unit S2a is permanently connected non-rotatably to the planetary gear support P12a of the first planetary gear stage P1a configured as an input stage. The inner disc support 16a of the combined gear shift unit S2a is configured integrally with the outer disc support of the first gear shift unit S1a. The friction-locking unit 12a is functionally disposed between the housing end wall 14a on the drive side and the rotatable coupling element S21a. The outer disc support 15a of the combined gear shift unit S2a is attached to the housing end wall 14a on the drive side. It is fastened to the housing end wall 14a on the drive side. Alternatively the outer disc support 15a can also be connected in a rather radial direction to a circumferential housing wall of the transmission housing 18a.

The form-locking unit 13a of the combined gear shift unit S2a is configured as a claw brake. The form-locking unit 13a comprises a first form-locking element 27a and a second form-locking element 28a. The first form-locking element 27a is permanently connected non-rotatably to the rotatable coupling element S21 of the combined gear shift unit S2a. It is connected non-rotatably to the inner disc support of the combined gear shift unit S2a. The first form-locking element 27a has a claw toothing. The claw toothing is fixed on the rotatable coupling element S21a of the combined gear shift unit S2a. The first form-locking element 27a is configured integrally with the rotatable coupling element S21a of the combined gear shift unit S2a. The second form-locking element 28a is permanently connected non-rotatably, but axially movably, to the transmission housing 18a. It is non-rotatably, but axially movably, connected to the circumferential housing wall 20a. The form-locking unit 13a is functionally disposed between the circumferential housing wall 20a and the rotatable coupling element S21a. The second form-locking element 28a has a claw toothing which corresponds to the claw toothing of the first form-locking element 27a. The claw toothings are in each case configured as an end toothing. The second form-locking element 28a is disposed so as to be axially movable relative to the first form-locking element 27a.

The friction-locking unit 12a and the form-locking unit 13a of the combined gear shift unit S2a are disposed axially between the housing end wall 14a on the drive side and the first planetary gear stage P1a configured as an input stage. The disc set of the friction-locking unit 12a and the claw toothings of the form-locking unit 13a are disposed axially between the housing end wall 14a and the first planetary gear stage P1a configured as an input stage.

The friction-locking unit 12a of the combined gear shift unit S2a is disposed axially at the height of the friction-locking unit 22a of the first gear shift unit S1a. The disc set of the friction-locking unit 12a of the combined gear shift unit S2a is disposed radially above the friction-locking unit 22a of the first gear shift unit S1a. The disc set of the friction-locking unit 22a of the first gear shift unit S1a is disposed radially inside the disc set of the friction-locking unit 12a of the combined gear shift unit S2a. An average diameter of an annular surface formed by a friction surface of the disc set of the combined gear shift unit S2a is greater than an average diameter of an annular surface formed by a friction surface of the disc set of the first gear shift unit S1a.

The form-locking unit 13a of the combined gear shift unit S2a is disposed axially between the friction-locking unit 12a of the combined gear shift unit S2a and the first planetary gear stage P1a configured as an input stage. The friction-locking unit 12a of the combined gear shift unit S2a is disposed axially between the housing end wall 14a on the drive side and the form-locking unit 13a of the combined gear shift unit S2a. The form-locking unit 13a of the combined gear shift unit S2a is disposed axially between the first gear shift unit S1a and the first planetary gear stage P1a configured as an input stage.

The form-locking unit 13a of the combined gear shift unit S2a is disposed radially inside the friction-locking unit 12a of the combined gear shift unit S2a. The form-locking unit 13a of the combined gear shift unit S2a is disposed radially at the height of the disc set of the friction-locking unit 22a of the first gear shift unit S1a. An average diameter of an annular surface formed by the claw toothing of the combined gear shift unit S2a is less than the average diameter of the annular surface formed by the friction surface of the disc set of the combined gear shift unit S2a. An average diameter of the annular surface formed by the claw toothing of the second gear shift unit S2a is between an internal and external diameter of the annular surface formed by the friction surface of the disc set of the first gear shift unit S1a.

For actuation of the friction-locking unit 12a and the form-locking unit 13a the combined gear shift unit S2a has two actuating units 29a, 30a which are independent of one another. The first actuating unit 29a actuates the friction-locking unit 12a. The first actuating unit 29a has an axially movable actuating element which, for fixed connection of the rotatable coupling element S21a of the combined gear shift to the housing, presses axially against the disc set of the friction-locking unit 12a of the combined gear shift unit S2a, so that discs of the disc set move axially relative to one another until they bear against one another and are connected to one another by non-positive engagement. The first actuating unit 29a is connected to the housing end wall 14a on the drive side. It is fastened to the housing end wall 14a on the drive side. The first actuating unit 29a is disposed axially between the friction-locking unit 12a of the combined gear shift unit S2a and the housing end wall 14a on the drive side. It is disposed axially between the form-locking unit 13a of the combined gear shift unit S2a and the housing end wall 14a on the drive side. The first actuating unit 29a is disposed axially between the friction-locking unit 22a of the first gear shift unit S1a and the housing end wall 14a on the drive side.

The second actuating unit 30a actuates the friction-locking unit 13a. The second actuating unit 30a has an axially movable actuating element which is fixedly connected to the second form-locking element 28a and is axially movably but non-rotatably connected to the transmission housing 18a. For fixed connection of the rotatable coupling element S21a of the combined coupling unit S2a to the housing, the actuating element of the second actuating unit 30a moves and therefore the second form-locking element 28a moves axially in the direction of the first form-locking element 27a, until the mutually corresponding claw toothings of the form-locking unit 13a of the combined gear shift unit 52a interengage by form-locking. For fixed connection of the rotatable coupling element S21a of the combined coupling unit S2a to the housing, the second form-locking element 28a is moved axially in the direction of the friction-locking unit 12a of the combined gear shift unit S2a. The second actuating unit 30a is connected to the circumferential housing wall 20a. It is fastened to the circumferential housing wall 20a. The second actuating unit 30a is disposed axially between the third gear shift unit S3a and the housing end wall 14a on the drive side. It is disposed axially between the friction-locking unit 12a of the combined gear shift unit S2a and the third gear shift unit S3a. The second actuating unit 30a partially surrounds the first gear shift unit S1a radially. The rotatable coupling element S12a of the combined gear shift unit S2a or the rotatable coupling element S12a of the first gear shift unit S1a are disposed partially inside the second actuating unit 30a. The second actuating unit 30a of the combined gear shift unit S2a partially surrounds the rotatable coupling element S21a of the combined gear shift unit S2a or the rotatable coupling element S12a of the first gear shift unit S1a.

For actuation of the friction-locking unit 22a of the first gear shift unit S1a the first gear shift unit S1a has an actuating unit 31a. The actuating unit 31a of the first gear shift unit S1a and the first actuating unit 29a of the combined gear shift unit S2a are disposed axially between the housing end wall 14a on the drive side and the second actuating unit 30a of the combined gear shift unit S2a. The actuating unit 31a of the first gear shift unit S1a is disposed axially between the friction-locking unit 22a of the first gear shift unit S1a and the housing end wall 14a on the drive side. It is disposed axially between the form-locking unit 13a of the combined gear shift unit S2a and the housing end wall 14a on the drive side. The actuating unit 31a of the first gear shift unit S1a is disposed radially inside the first actuating unit 29a of the combined gear shift unit S2a. The actuating element of the actuating unit 29a of the combined gear shift unit S2a radially surrounds the actuating unit 31a of the combined gear shift unit S1a.

The actuating units 29a, 30a, 31a in each case have an axial closing direction in which the corresponding actuating element is moved for closing the friction-locking unit 12a or the form-locking unit 13a. The closing direction of the first actuating unit 29a of the combined gear shift unit S2a and the closing direction of the actuating unit 31a of the first gear shift unit S1a are oriented in the same direction. The closing direction of the first actuating unit 29a of the combined gear shift unit S2a and the closing direction of the actuating unit 31a of the first gear shift unit S1a are directed away from the housing end wall 14a on the drive side and towards the housing end wall 19a on the output side. The closing direction of the second actuating unit 30a of the combined gear shift unit S2a is directed counter to the closing direction of the actuating unit 29a of the combined gear shift unit S2a and the closing direction of the actuating unit 31a of the first gear shift unit S1a. The closing direction of the second actuating unit 30a of the combined gear shift unit S2a is directed away from the housing end wall 19a on the output side and towards the housing end wall 14a on the drive side.

The actuating units 29a, 30a, 31a are in each case hydraulic. In principle, however, the actuating units 29a, 30a, 31a can also be electric or pneumatic. The gear shift units S1a, S2a, S3a, S4a, S5a, S6a and the actuating units 29a, 30a, 31a are disposed inside the transmission housing 18a. In principle, for actuation of the friction-locking unit 12a and the form-locking unit 13a the combined gear shift unit S2a can have a common actuating unit or two actuating units which are independent of one another. In this case the friction-locking unit 12a and the form-locking unit 13a are actuated one after the other, wherein the friction-locking unit 12a preferably engages before the form-locking unit 13a.

Figure 3:
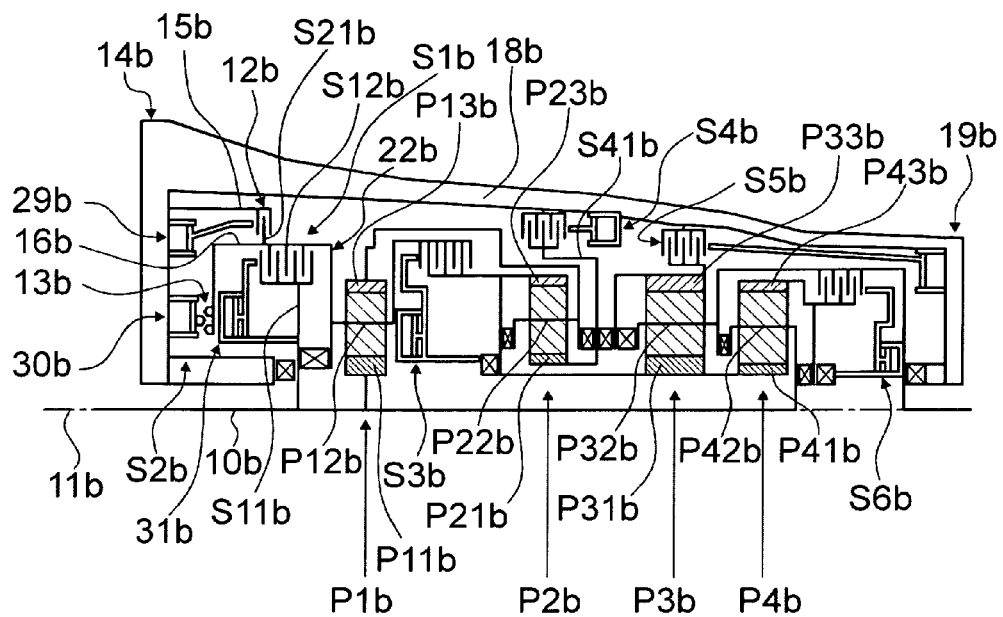
FIG. 3 shows schematically an alternative design of a multi-stage transmission.
Figure 4:
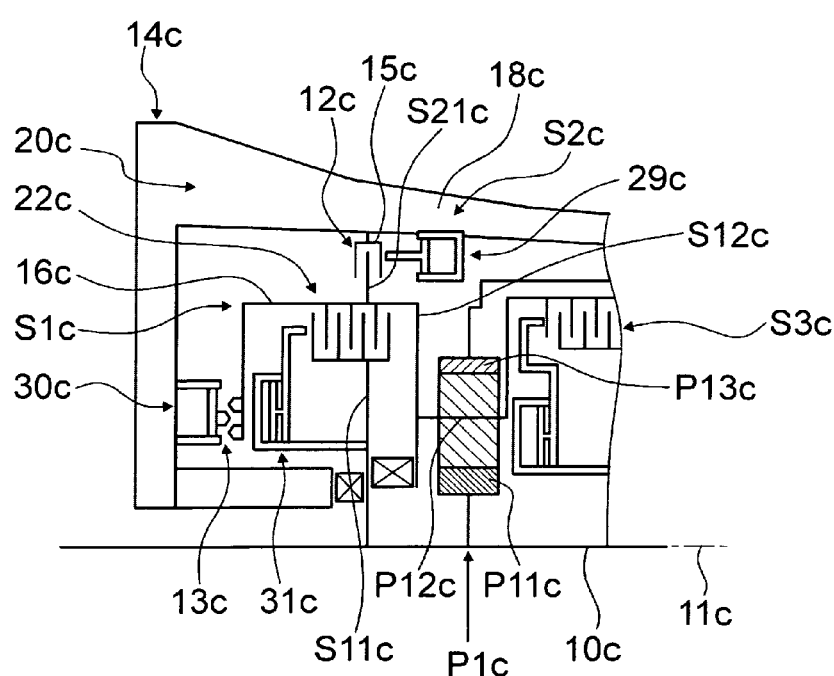
FIG. 4 shows schematically a part of a multi-stage transmission in a third exemplary embodiment.
Figure 5:
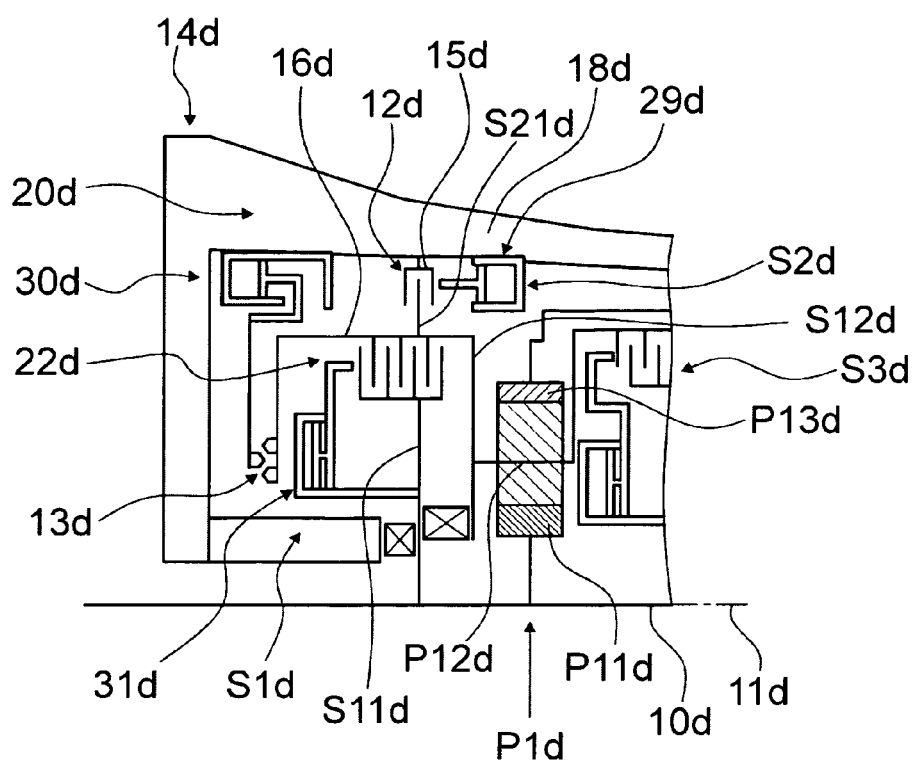
FIG. 5 shows schematically a part of a multi-stage transmission in a fourth exemplary embodiment.

Three further exemplary embodiments of the invention are illustrated in FIGS. 3 to 5. The following descriptions are limited substantially to the differences between the exemplary embodiments, wherein with regard to components with the same designations, in particular with regard to components with the same reference signs, reference may be made in principle to the drawings and/or the description of the other exemplary embodiments, in particular the exemplary embodiment shown in FIGS. 1 and 2. In order to distinguish the exemplary embodiments, the letter a in the reference signs of the exemplary embodiment shown in FIGS. 1 to 2 is replaced by the letter b in the reference signs of the exemplary embodiments shown in FIGS. 3 to 5.

A second exemplary embodiment of a multi-stage transmissions of a motor vehicle is illustrated in FIG. 3. The multi-stage transmission comprises a transmission input shaft 10b, four planetary gear stages P1b, P2b, P3b, P4b disposed one behind the other along a main axis of rotation 11b and six gear shift units S1b, S2b, S3b, S4b, S5b, S6b. The planetary gear stages P1b, P2b, P3b, P4b in each case have a sun gear P11b, P21b, P31b, P41b, a planetary gear support P12b, P22b, P32b, P42b and a ring gear P13b, P23b, P33b, P43b. The multi-stage transmission also has a transmission housing 18b which comprises a housing end wall 14b on the drive side, a housing end wall 19b on the output side and a circumferential housing wall 20b.

The first gear shift unit S1b is configured as a coupling and has a first rotatable coupling element S11b and a second rotatable coupling element S12b, wherein the first rotatable coupling element S11b is permanently connected non-rotatably to the transmission input shaft 10b and the second rotatable coupling element S12d is permanently connected non-rotatably to the planetary gear support P12d of the first planetary gear stage P1b. The second gear shift unit S2b is configured as a brake and has a rotatable coupling element S21b which can be fixedly connected to the housing. The second gear shift unit S2b also has a friction-locking unit 12b and a form-locking unit 13b connected in parallel with the friction-locking unit 12b, which are in each case provided in order to connect the rotatable coupling element S21b fixedly to the housing. The second gear shift unit S2a is configured as a combined gear shift unit and is associated with the first planetary gear stage P1a which is configured as an input stage, so that the first planetary gear stage P1a is configured as a planetary gear stage assigned with the combined gear shift unit S2a. Furthermore, the second gear shift unit S2b comprises an inner disc support 16b which is connected non-rotatably to the rotatable coupling element S21a, and an outer disc support 15b which is disposed fixedly on the housing. The outer disc support 15b is preferably connected to the housing end wall 14b or alternatively to a circumferential wall of the transmission housing.

In contrast to the previous exemplary embodiment, the form-locking unit 13b of the combined gear shift unit S2b is disposed axially between the friction-locking unit 12b of the combined gear shift unit S2b and the housing end wall 14b on the drive side. The form-locking unit 13b of the combined gear shift unit S2b is disposed axially between the first gear shift unit S1b and the housing end wall 14b on the drive side.

The form-locking unit 13b has claw toothings which, in contrast to the previous exemplary embodiment, are disposed radially inside a friction-locking unit 22b of the first gear shift unit S1b. An average diameter of an annular surface formed by the claw toothings of the combined gear shift unit S2b is smaller than an average diameter of an annular surface formed by a friction surface of the friction-locking unit 22b of the first gear shift unit S1b.

The combined gear shift unit S2b comprises a first actuating unit 29b, which is provided for actuation of the friction-locking unit 12b, and a second actuating unit 30b which is provided for actuation of the form-locking unit 13b. In contrast to the previous exemplary embodiment the second actuating unit 30b is disposed radially inside the first actuating unit 29b. The claw toothings of the form-locking unit 13b are disposed radially inside the first actuating unit 29b of the combined gear shift unit S2b. An actuating element of the first actuating unit 29b of the combined gear shift unit S2b surrounds the form-locking unit 13b. In contrast to the previous exemplary embodiment the friction-locking unit 13b is functionally disposed between the housing end wall 14b on the drive side and the rotatable coupling element S21b. The second actuating unit 30b of the combined gear shift unit S2b is attached to the housing end wall 14b on the drive side. It is fastened to the housing end wall 14b on the drive side. The friction-locking unit 12b and the form-locking unit 13b are both functionally disposed between the housing end wall 14b on the drive side and the rotatable coupling element S21b.

The first gear shift unit S1b has an actuating unit 31b which is provided for actuation of the friction-locking unit 22b of the first gear shift unit S1b. In contrast to the previous embodiment, the form-locking unit 13b of the combined gear shift unit S2b is disposed axially between the actuating unit 31b of the first gear shift unit S1b and the housing end wall 14b on the drive side. The first actuating unit 29b of the combined shift unit S2n, the second actuating unit 30b of the combined gear shift unit S2b and the actuating unit 31b of the first gear shift unit S1b are disposed axially between the housing end wall 14b on the drive side and the friction-locking unit 12b of the combined gear shift unit S2b. The actuating unit 31b of the first gear shift unit S1a is disposed axially between the form-locking unit 13b of the combined gear shift unit S2b and the friction-locking unit 22b of the first gear shift unit S1b. It is disposed axially between the form-locking unit 13b of the combined gear shift unit S2b and the planetary gear stage P1b associated with the combined gear shift unit S2a. The form-locking unit 13b of the combined gear shift unit S2b is disposed axially between the second actuating unit 30b of the combined gear shift S2b and the actuating unit 31b of the first gear shift unit S1b.

The actuating units 29b, 30b, 31b in each case have an axial closing direction in which the corresponding actuating element is moved for closing the friction-locking unit 12b or the form-locking unit 13b. The closing direction of the first actuating unit 29b of the combined gear shift unit S2b, the closing direction of the second actuating unit 30b of the combined gear shift unit S2b and the closing direction of the actuating unit 31b of the first gear shift unit S1a are oriented in the same direction. The closing direction of the first actuating unit 29b of the combined gear shift unit S2b, the closing direction of the second actuating unit 30b of the combined gear shift unit S2b and the closing direction of the actuating unit 31b of the first gear shift unit S1a are in each case directed away from the housing end wall 14b on the drive side and towards the housing end wall 19b on the output side.

A third exemplary embodiment of a multi-stage transmission of a motor vehicle is illustrated in FIG. 4. The multi-stage transmission comprises a transmission input shaft 10c, four planetary gear stages disposed one behind the other along a main axis of rotation 11c and six gear shift units, wherein only the first planetary gear stage P1c, the first gear shift unit S1c, the second gear shift unit S2c and the third gear shift unit S3c are shown in FIG. 4. In this case the first planetary gear stage P1c has a sun gear P11c, a planetary gear support P12c and a ring gear P13c. The second gear shift unit S2c is configured as a combined gear shift unit and is associated with the first planetary gear stage P1c which is configured as an input stage, so that the first planetary gear stage P1c is configured as a planetary gear stage associated with the combined gear shift unit S2c. The multi-stage transmission also has a transmission housing 18c which comprises a housing end wall 14c on the drive side, a housing end wall (not shown) on the output side and a circumferential housing wall 20c.

The first gear shift unit S1c is configured as a coupling and has a first rotatable coupling element S11c and a second rotatable coupling element S12c, wherein the first rotatable coupling element S11c is permanently connected non-rotatably to the transmission input shaft 10c and the second rotatable coupling element S12c is permanently connected non-rotatably to the planetary gear support P12c of the planetary gear stage P1c associated with the combined gear shift unit S2c. The combined gear shift unit S2c is configured as a brake and has a rotatable coupling element S21c which can be fixedly connected to the housing. The combined gear shift unit S2c also has a friction-locking unit 12c and a form-locking unit 13c connected in parallel with the friction-locking unit 12c, which are in each case provided in order to connect the rotatable coupling element 21c fixedly to the housing. Furthermore, the combined gear shift unit S2c comprises an inner disc support 16c which is connected non-rotatably to the rotatable coupling element S21c, and an outer disc support 15c which is disposed fixedly on the housing. In contrast to the previous exemplary embodiment the friction-locking unit 12c is functionally disposed between the circumferential housing wall 20c and the rotatable coupling element S21c. The outer disc support 15c of the friction-locking unit 12c is advantageously connected to the circumferential housing wall 20c. It is fastened to the circumferential housing wall 20c. Alternatively the outer disc support 15c can also be connected to the housing end wall 14c.

The combined gear shift unit S2c comprises a first actuating unit 29c, which is provided for actuation of the friction-locking unit 12c, and a second actuating unit 30c which is provided for actuation of the form-locking unit 13c. In contrast to the previous exemplary embodiment, the first actuating unit 29c of the combined gear shift unit S2c is disposed axially between the housing end wall 14c and the planetary gear stage P1c associated with the combined gear shift unit S2c. An actuating element of the first actuating unit 29c surrounds the second rotatable coupling element S12c of the first gear shift unit S1c. The second rotatable coupling element S12c of the first gear shift unit S1c is disposed radially inside the first actuating unit 29c of the combined gear shift unit S2c. The friction-locking unit 12c of the combined gear shift unit S2c is disposed axially between the housing end wall 14c on the drive side and the first actuating unit 29c of the combined gear shift unit S2c. The first actuating unit 29c of the combined gear shift unit S2c is connected to the circumferential housing wall 20c. It is fastened to the circumferential housing wall 20c.

The first gear shift unit S1b has an actuating unit 31c which is provided for actuation of the friction-locking unit 22c of the first gear shift unit S1c. In contrast to the preceding exemplary embodiment the second actuating unit 30c of the combined gear shift unit S2c and the actuating unit 31c of the first gear shift unit S1c is disposed axially between the housing end wall 14c on the drive side and the first actuating unit 29c of the combined gear shift unit S2c. The friction-locking unit 12c of the combined gear shift unit S2c is disposed axially between the first actuating unit 29c of the combined gear shift unit S2c and the actuating unit 31c of the first gear shift unit S1c.

The actuating units 29c, 30c, 31c in each case have an axial closing direction in which the corresponding actuating element is moved for closing the friction-locking unit 12c or the form-locking unit 13c. In contrast to the preceding exemplary embodiments the closing direction of the second actuating unit 30c of the combined gear shift unit S2c and the closing direction of the actuating unit 31c of the first gear shift unit S1c are oriented in the same direction. The closing direction of the second actuating unit 30c of the combined gear shift unit S2c and the closing direction of the actuating unit 31c of the first gear shift unit S1c are directed away from the housing end wall 14c on the drive side and towards the housing end wall on the output side. The closing direction of the first actuating unit 29c of the combined gear shift unit S1c is directed counter to the closing direction of the second actuating unit 30c of the combined gear shift unit S2c and the closing direction of the actuating unit 31c of the first gear shift unit S1c. The closing direction of the first actuating unit 29c of the combined gear shift unit S2c is directed away from the housing end wall on the output side and towards the housing end wall 14c on the drive side.

A fourth exemplary embodiment of a multi-stage transmission of a motor vehicle is illustrated in FIG. 5. The multi-stage transmission comprises a transmission input shaft 10d, four planetary gear stages disposed one behind the other along a main axis of rotation 11d and six gear shift units, wherein only the first planetary gear stage P1d, the first gear shift unit S1d, the second gear shift unit S2d and the third gear shift unit S3d are shown in FIG. 5. In this case the first planetary gear stage P1d has a sun gear P11d, a planetary gear support P12d and a ring gear P13d. The second gear shift unit S2d is configured as a combined gear shift unit and is associated with the first planetary gear stage P1d which is configured as an input stage, so that the first planetary gear stage P1d is configured as a planetary gear stage associated with the combined gear shift unit S2d. The multi-stage transmission also has a transmission housing 18d which comprises a housing end wall 14b on the drive side and a circumferential housing wall 20d.

The first gear shift unit S1d is configured as a clutch and has a first rotatable coupling element S11d and a second rotatable coupling element S12d, wherein the first rotatable coupling element S11d is permanently connected non-rotatably to the transmission input shaft 10d and the second rotatable coupling element S12d is permanently connected non-rotatably to the planetary gear support P12d of the planetary gear stage P1d associated with the combined gear shift unit S2d. The combined gear shift unit S2d is configured as a brake and has a rotatable coupling element S21d which can be fixedly connected to the housing. The combined gear shift unit S2d also has a friction-locking unit 12d and a form-locking unit 13d connected in parallel with the friction-locking unit 12d, which are in each case provided in order to connect the rotatable coupling element 21d fixedly to the housing. Furthermore, the combined gear shift unit S2d comprises an inner disc support 16d which is connected non-rotatably to the rotatable coupling element S21d, and an outer disc support 15d which is disposed fixedly on the housing.

The combined gear shift unit S2d comprises a first actuating unit 29d, which is provided for actuation of the friction-locking unit 12d, and a second actuating unit 30d which is provided for actuation of the form-locking unit 13d. The first gear shift unit S11d has an actuating unit 31d which is provided for actuation of a friction-locking unit 22d of the first gear shift unit S11d. The second actuating unit 30d of the combined shift unit S2d and the actuating unit 31d of the first gear shift unit S1d is disposed axially between the housing end wall 14d on the drive side and the first actuating unit 29d of the combined gear shift unit S2d. In contrast to the preceding exemplary embodiment, the second actuating unit 30d of the combined gear shift unit S2d is attached to the circumferential housing wall 20d. Alternatively the second actuating unit 30d can also be attached to the housing end wall 14d. The second actuating unit 30d of the combined gear shift unit S2d is fastened to the circumferential housing wall 20d. The friction-locking unit 12d and the form-locking unit 13d are both functionally disposed between the circumferential housing wall 20d and the rotatable coupling element S21d.

The actuating unit 31d of the first gear shift unit S1d is disposed radially inside the second actuating unit 30d of the combined gear shift unit S2d. The second actuating unit 30d of the combined gear shift unit S2d radially surrounds the form-locking unit 13d of the combined gear shift unit S2d. In this case the friction-locking unit 12d of the combined gear shift unit S2d is disposed axially between the actuating unit 31d of the first gear shift unit S1a and the first actuating unit 29d of the combined gear shift unit S2d.

The invention claimed is:

1. A multi-stage transmission for a motor vehicle, comprising:
  a transmission input shaft for non-rotatable connection of an internal combustion engine;
  at least four planetary gear stages which are disposed along a main axis of rotation; and
  a combined gear shift unit which is configured as a brake and which has a rotatable coupling element and a friction-locking unit and a form-locking unit connected in parallel with the friction-locking unit which are provided to connect the rotatable coupling element fixedly to a housing;
  wherein one of the at least four planetary gear stages is associated with the combined gear shift unit and includes a first transmission element which is permanently connected non-rotatably to the rotatable coupling element;
wherein the one of the at least four planetary gear stages associated with the combined gear shift unit includes a second transmission element which is permanently connected non-rotatably to the transmission input shaft;
and wherein the form-locking unit is disposed radially inside the friction-locking unit.

2. The multi-stage transmission according to claim 1, wherein the second transmission element which is permanently connected non-rotatably to the transmission input shaft is configured as a sun gear.

3. The multi-stage transmission according to claim 1, wherein the first transmission element which is permanently connected non-rotatably to the rotatable coupling element is a planetary gear support.

4. The multi-stage transmission according to claim 1, wherein the one of the at least four planetary gear stages associated with the combined gear shift unit has a transmission element which is configured as a ring gear and is connected non-rotatably to a transmission element of at least one of the other planetary gear stages.

5. The multi-stage transmission according to claim 1, wherein the rotatable coupling element is connected non-rotatably to a transmission element of at least one of the other planetary gear stages.

6. The multi-stage transmission according to claim 1, further comprising a housing end wall on a drive side, wherein the one of the at least four planetary gear stages associated with the combined gear shift unit is disposed immediately adjacent to the housing end wall on the drive side with respect to the other planetary gear stages.

7. The multi-stage transmission according to claim 6, wherein the friction-locking unit and the form-locking unit is are disposed axially between the housing end wall on the drive side and the one of the at least four planetary gear stages associated with the combined gear shift unit.

8. The multi-stage transmission according to claim 1, wherein the form-locking unit is disposed axially between the friction-locking unit and the one of the at least four planetary gear stages associated with the combined gear shift unit.

9. The multi-stage transmission according to claim 1, further comprising a gear shift unit which is configured as a clutch and has a rotatable coupling element which is permanently connected non-rotatably to the transmission input shaft and has an outer disc support which is configured at least partially integrally with an inner disc support of the friction-locking unit.

10. The multi-stage transmission according to claim 9, further comprising a housing end wall on a drive side and wherein the form-locking unit is disposed axially between the housing end wall on the drive side and the gear shift unit.

11. The multi-stage transmission according to claim 9, further comprising a housing end wall on a drive side and wherein the combined gear shift unit has a first actuating unit provided for actuating the friction-locking unit and a second actuating unit provided for actuating the form-locking unit and wherein the gear shift unit has a third actuating unit, wherein the first actuating unit and the third actuating unit are disposed axially between the housing end wall on the drive side and the second actuating unit.

12. The multi-stage transmission according to claim 9, further comprising a housing end wall on a drive side and wherein the combined gear shift unit has a first actuating unit provided for actuating the friction-locking unit and a second actuating unit provided for actuating the form-locking unit and wherein the gear shift unit has a third actuating unit, wherein the first actuating unit, the second actuating unit, and the third actuating unit are disposed axially between the housing end wall on the drive side and the friction-locking unit.

13. The multi-stage transmission according to claim 9, further comprising a housing end wall on a drive side and wherein the combined gear shift unit has a first actuating unit provided for actuating the friction-locking unit and a second actuating unit provided for actuating the form-locking unit and wherein the gear shift unit has a third actuating unit, wherein the second actuating unit and the third actuating unit are disposed axially between the housing end wall on the drive side and the first actuating unit.

14. The multi-stage transmission according to claim 1, wherein with respect to an axial succession starting from the internal combustion engine the one of the at least four planetary gear stages associated with the combined gear shift unit is configured as a first planetary gear stage and a planetary gear stage adjacent to the first planetary gear stage is configured as a second planetary gear stage, wherein the adjacent planetary gear stage has a transmission element which is configured as a planetary gear support and is permanently connected non-rotatably to a transmission element configured as a ring gear of the one of the at least four planetary gear stages associated with the combined gear shift unit, and has a transmission element which is configured as a ring gear and is permanently connected non-rotatably to a transmission element configured as a sun gear of a third planetary gear stage and to a transmission element configured as a sun gear of a fourth planetary gear stage and is connected non-rotatably to the transmission element configured as a planetary gear support of the one of the at least four planetary gear stages associated with the combined gear shift unit.

* * * * *